US012724373B2

(12) United States Patent
Nagata et al.

(10) Patent No.: US 12,724,373 B2
(45) Date of Patent: Sep. 1, 2026

(54) IMAGE FORMING APPARATUS FOR ADJUSTING POSITION AND SIZE OF IMAGE

(71) Applicant: CANON KABUSHIKI KAISHA, Tokyo (JP)

(72) Inventors: Teppei Nagata, Chiba (JP); Tomohito Nakagawa, Chiba (JP); Yukihiro Soeta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/978,435

(22) Filed: Dec. 12, 2024

(65) Prior Publication Data

US 2025/0216809 A1 Jul. 3, 2025

(30) Foreign Application Priority Data

Dec. 28, 2023 (JP) ................................ 2023-223260

(51) Int. Cl.
*G03G 15/00* (2006.01)
*G03G 15/23* (2006.01)

(52) U.S. Cl.
CPC ....... *G03G 15/6567* (2013.01); *G03G 15/231* (2013.01); *G03G 15/5029* (2013.01); *G03G 15/5041* (2013.01); *G03G 15/6564* (2013.01); *G03G 15/6573* (2013.01); *G03G 2215/0043* (2013.01); *G03G 2215/00569* (2013.01)

(58) Field of Classification Search
CPC ............ G03G 15/6567; G03G 15/231; G03G 15/5029; G03G 15/5041; G03G 15/6564; G03G 15/6573; G03G 2215/0043; G03G 2215/00569
See application file for complete search history.

(56) References Cited

U.S. PATENT DOCUMENTS

2010/0290093 A1 11/2010 Ito
2014/0037350 A1* 2/2014 Suzuki ..................... B65H 7/02 399/388
2018/0081314 A1* 3/2018 Suzuki ............... G03G 15/5004
2018/0284646 A1* 10/2018 Suzuki ............... G03G 15/0856
2019/0064723 A1* 2/2019 Nakagawa ........... G03G 15/602
2022/0236681 A1* 7/2022 Hirose ............... G03G 15/5062
2022/0308516 A1* 9/2022 McCarthy ................ B41J 13/32

FOREIGN PATENT DOCUMENTS

JP 2005221582 A 8/2005
JP 5572993 B2 8/2014

* cited by examiner

*Primary Examiner* — David H Banh
(74) *Attorney, Agent, or Firm* — ROSSI, KIMMS & McDOWELL LLP

(57) ABSTRACT

An image forming apparatus includes: an image forming unit configured to form an adjustment pattern on a sheet; a reading device provided further downstream than a fixing member in a conveyance direction, and configured to read the sheet on which the adjustment pattern has been fixed by the fixing member; and a processor configured to: detect a length, in the conveyance direction, of the sheet; and adjust a position, in the conveyance direction, and a size, in the conveyance direction, of an image to be formed on the sheet by the image forming unit, based on a reading result obtained by the reading device reading the sheet and the detected length.

15 Claims, 12 Drawing Sheets

FIG. 7

| SHEET TYPE | | | | | ORIENTATION | ADJUSTMENT AMOUNT | |
|---|---|---|---|---|---|---|---|
| SHEET NAME | SIZE | GRAMMAGE | SURFACE PROPERTY | COLOR | | FIRST SURFACE | SECOND SURFACE |
| S#1 | LONG SIDE: Ll<br>SHORT SIDE: Ls | B#1 | EMBOSS | WHITE | PORTRAIT | LEAD POSITION: +0.3 mm<br>SIDE POSITION: -0.1 mm<br>MAIN SCANNING MAGNIFICATION: +0.02%<br>SUB-SCANNING MAGNIFICATION: +0.01% | LEAD POSITION: +0.2 mm<br>SIDE POSITION: +0.1 mm<br>MAIN SCANNING MAGNIFICATION: +0.02%<br>SUB-SCANNING MAGNIFICATION: -0.03% |
| | | | | | LANDSCAPE | LEAD POSITION: +0.0 mm<br>SIDE POSITION: +0.0 mm<br>MAIN SCANNING MAGNIFICATION: +0.00%<br>SUB-SCANNING MAGNIFICATION: +0.00% | LEAD POSITION: +0.0 mm<br>SIDE POSITION: +0.0 mm<br>MAIN SCANNING MAGNIFICATION: +0.00%<br>SUB-SCANNING MAGNIFICATION: +0.00% |
| ... | | | | | | | |

IMAGE FORMING APPARATUS FOR ADJUSTING POSITION AND SIZE OF IMAGE

BACKGROUND OF THE INVENTION

Field of the Invention

The present invention relates to a technique for adjusting an image forming position on a sheet.

Description of the Related Art

In image forming apparatuses, there may be a requirement that an image forming position (printing position) on a sheet be accurately controlled. Further, when printing an image on both sides of a sheet, there may be a requirement that control be performed such that a shift does not occur between image forming positions on the front surface (first surface) and the back surface (second surface) of the sheet. Performing control such that a shift does not occur between image forming positions on the front surface and the back surface of a sheet is also referred to as "front-to-back registration".

Japanese Patent Laid-Open No. 2005-221582 discloses a configuration for forming a specific pattern on a sheet and, based on a result of reading of the specific pattern formed on the sheet, controlling an image forming position on a sheet. Further, US-2010-0290093 discloses a configuration for reading an image formed on a sheet with an image sensor.

For example, when a cut sheet is used, the size of the cut sheet may vary from a target value (nominal value) due to cutting accuracy. The size of the sheet may also vary depending on processing for fixing an image to the sheet. When the size of the sheet on which a specific pattern for adjusting an image forming position has been formed is different from its nominal value, the image forming position cannot be adjusted with high accuracy.

SUMMARY OF THE INVENTION

According to an aspect of the present disclosure, an image forming apparatus includes: an image forming unit configured to form an adjustment pattern on a sheet; a fixing member configured to fix the adjustment pattern on the sheet by heating the adjustment pattern on the sheet; a conveyance roller configured to convey the sheet on which the adjustment pattern has been fixed by the fixing member; a reading device provided further downstream than the fixing member in a conveyance direction in which the conveyance roller conveys the sheet, and configured to read the sheet on which the adjustment pattern has been fixed by the fixing member; and a processor configured to: detect a length, in the conveyance direction, of the sheet on which the adjustment pattern has been fixed to both surfaces of the sheet by the fixing member; and adjust a position, in the conveyance direction, and a size, in the conveyance direction, of an image to be formed on the sheet by the image forming unit, based on a reading result obtained by the reading device reading the sheet on which the adjustment pattern has been fixed to both sides of the sheet by the fixing member and the detected length.

Further features of the present invention will become apparent from the following description of exemplary embodiments with reference to the attached drawings.

BRIEF DESCRIPTION OF THE DRAWINGS

FIG. 7 is a view illustrating an example of geometric correction information.

DESCRIPTION OF THE EMBODIMENTS

Figure 1:
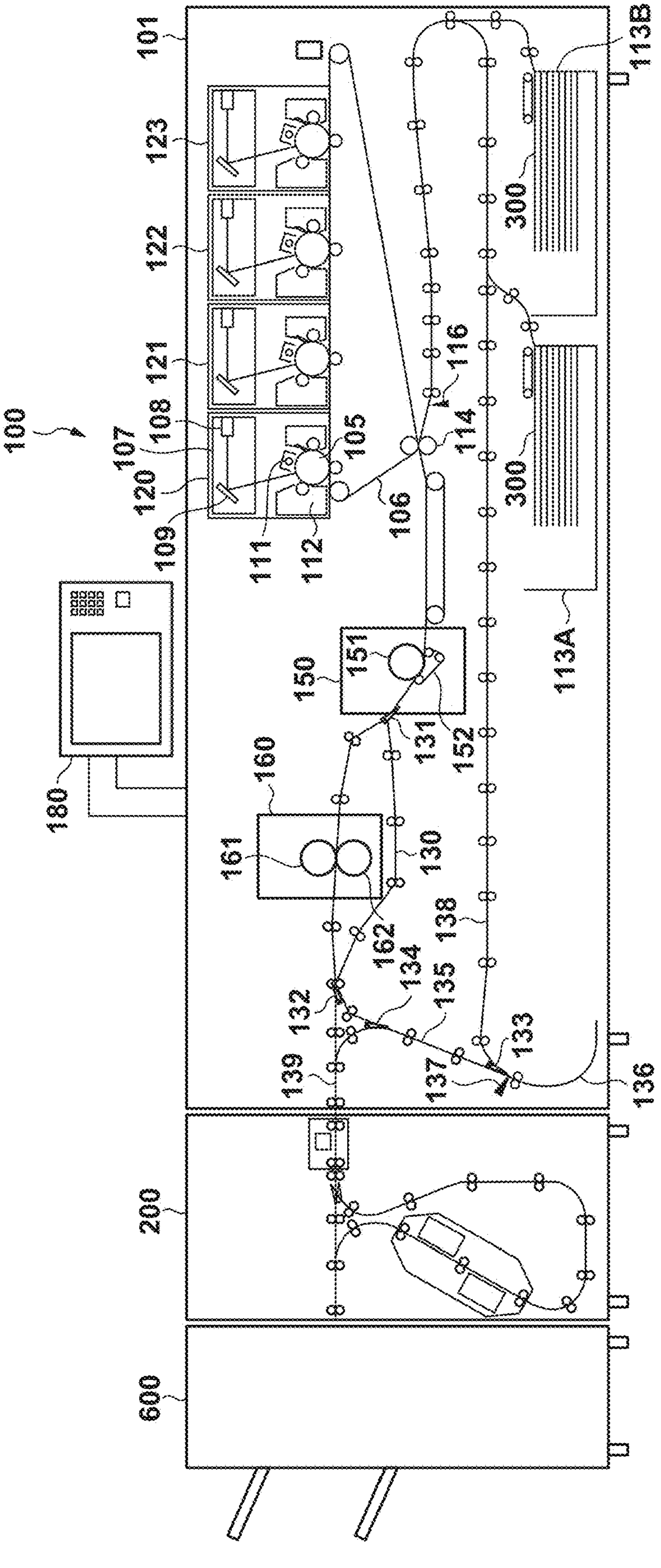
FIG. 1 is a schematic cross-sectional view of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, an embodiment will be described using an electrophotographic image forming apparatus; however, the content of the present disclosure is also applicable to another type of image forming apparatus such as an inkjet image forming apparatus.

FIG. 1 is a schematic cross-sectional view of an image forming apparatus 100 according to the present embodiment. The image forming apparatus 100 includes a printer unit 101, an operation unit 180, an adjustment unit 200, and a post-processing unit 600. Although not illustrated in FIG. 1, the image forming apparatus 100 includes a controller 103 (FIG. 6), which controls the entire image forming apparatus 100, and an engine control unit 312 (FIG. 6), which controls image formation on a sheet by controlling each member illustrated in FIG. 1 under the control of the controller 103. The operation unit 180 includes key buttons, a touch panel, and the like and provides a user interface.

The printer unit 101 forms an image on a sheet based on image data. The printer unit 101 includes four image forming units 120, 121, 122, and 123, which form images for respective color components. The image forming units 120 to 123 form yellow, magenta, cyan, and black images, respectively. Since the image forming units 120 to 123 have similar configurations except for the color of the toner used for image formation, the configuration of the image forming unit 120, which forms a yellow image, will be described below as a representative example.

A photosensitive body 105 is rotationally driven in a counterclockwise direction in the figure at the time of image formation. A charging device 111 charges the photosensitive body 105. A scanning unit 107 scans the photosensitive body 105 with a laser beam based on image data to form an electrostatic latent image on the photosensitive body 105. The scanning unit 107 includes a light source 108, which emits a laser beam, and a polygon mirror 109, which reflects the laser beam emitted by the light source 108 toward the photosensitive body 105 and moves the laser beam in a main scanning direction on the photosensitive body 105. The main scanning direction is a direction parallel to the rotation axis of the photosensitive body 105. Further, a circumferential direction of the photosensitive body 105 is referred to as a sub-scanning direction. The sub-scanning direction is a direction perpendicular to the main scanning direction. A developing device 112 develops the electrostatic latent image on the photosensitive body 105 with yellow toner to form a yellow toner image on the photosensitive body 105. The image formed on the photosensitive body 105 is transferred to an intermediate transfer belt 106. Colors different from yellow, magenta, cyan, and black can be reproduced by transferring yellow, magenta, cyan, and black images formed on the respective photosensitive bodies 105 of the four image forming units 120 to 123 to the intermediate transfer belt 106 in a superimposed manner.

The intermediate transfer belt 106 is rotationally driven in a clockwise direction in the figure at the time of image formation. Therefore, an image transferred to the intermediate transfer belt 106 is conveyed to a position facing a secondary transfer roller 114. The secondary transfer roller 114 transfers the image on the intermediate transfer belt 106 to a sheet 300 fed from a cassette 113A or 113B to a conveyance path and conveyed along the conveyance path. A result of detection of the sheet 300 by a registration sensor 116 is used to adjust a timing of feeding the sheet 300 to the position facing the secondary transfer roller 114.

The sheet 300 on which an image has been transferred is conveyed to fixing devices 150 and 160. The fixing devices 150 and 160 heat and press the sheet 300 to which the image has been transferred and thereby fix the image onto the sheet 300. The fixing device 150 includes a fixing roller 151, which includes a heater, and a pressing belt 152, which presses the sheet 300 to the fixing roller 151. The fixing device 160 is arranged on a downstream side of the fixing device 150 in a conveyance direction of the sheet 300. The fixing device 160 includes a fixing roller 161, which includes a heater, and a pressing roller 162, which presses the sheet 300 to the fixing roller 161. Depending on the type or the like of the sheet 300, fixing processing by the fixing device 160 is not necessary. When the fixing processing by the fixing device 160 is not necessary, the sheet 300 which has passed through the fixing device 150 is guided to a conveyance path 130 by a flapper 131.

A flapper 132 is a guide member for switching between guiding the sheet 300 to a conveyance path 135 or a conveyance path 139. The sheet 300, on which an image has been formed on one side and to be discharged face up or on which image formation has been performed on both sides when an image is to be formed on both sides, is guided to the conveyance path 139. Meanwhile, the sheet 300, on which an image has been formed on one side and to be discharged face down or on which image formation has been performed on one side when an image is to be formed on both sides, is guided to the conveyance path 135. The sheet 300 guided to the conveyance path 135 is conveyed to a reversing unit 136, and when a reversing sensor 137 detects the trailing end of the sheet 300, the conveyance direction of the sheet 300 is reversed.

A flapper 133 is a guide member for switching between guiding the sheet 300 conveyed to the reversing unit 136 to a conveyance path 138 or the conveyance path 135. When being discharged face down, the sheet 300 is conveyed to the conveyance path 135 again and is guided to the conveyance path 139 by a flapper 134. Meanwhile, when forming an image on both sides, the sheet 300 on which an image has been formed on one side is conveyed to the position facing the secondary transfer roller 114 again along the conveyance path 138, and an image is formed on the other surface of the sheet 300.

Figure 2:
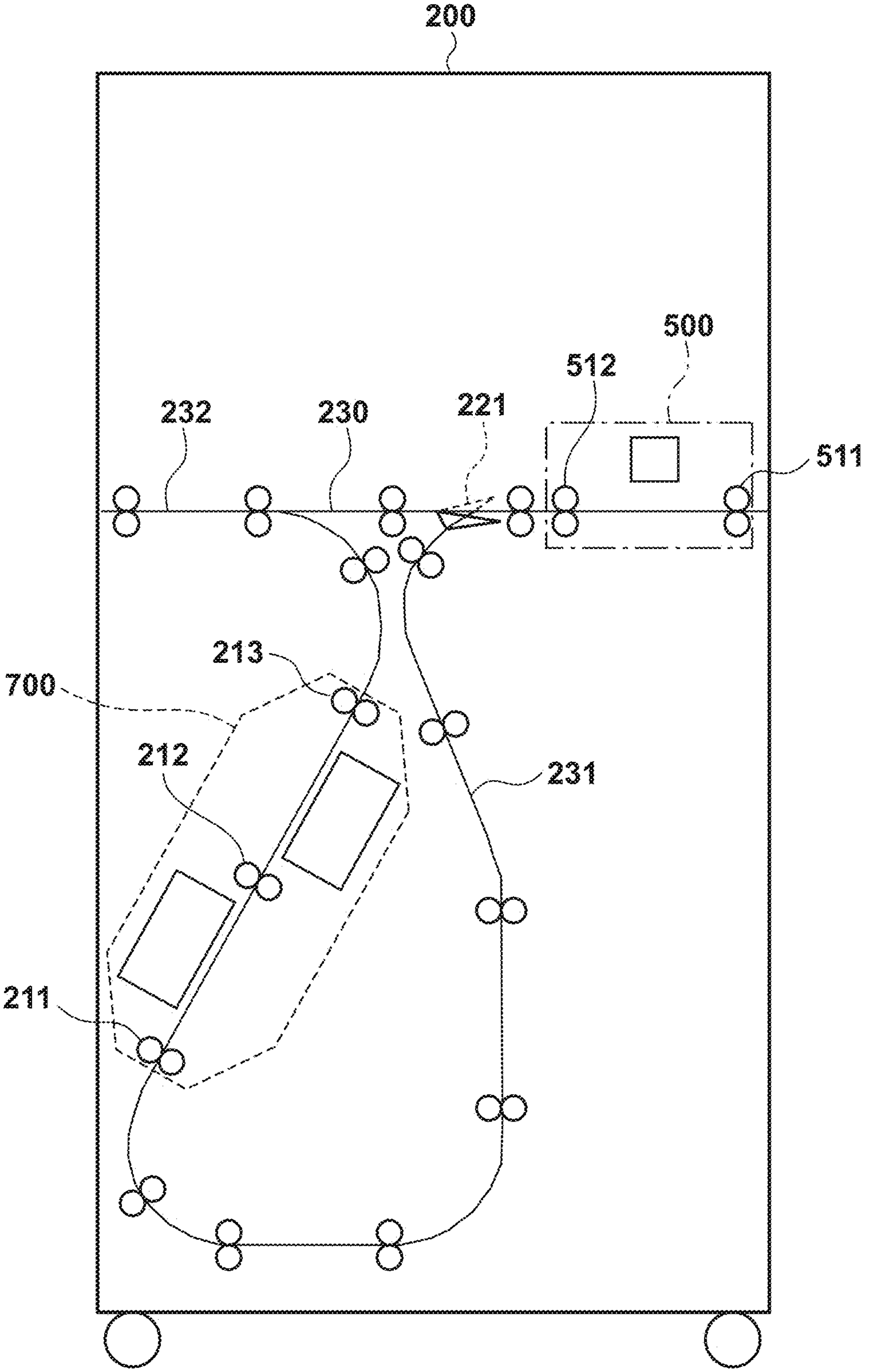
FIG. 2 is a schematic cross-sectional view of an adjustment unit.

The sheet 300 guided to the conveyance path 139 is conveyed to the adjustment unit 200. FIG. 2 is a schematic cross-sectional view of the adjustment unit 200. The sheet 300 conveyed to the adjustment unit 200 first passes through a measuring unit 500, which measures a length LP of the sheet 300 in the conveyance direction. The sheet 300 which has passed through the measuring unit 500 is guided by a flapper 221 to a through path 230 or a measuring path 231. In the present embodiment, when not performing position adjustment processing to be described later, the sheet 300 is guided to the through path 230, and when performing the position adjustment processing, the sheet 300 is guided to the measuring path 231. The sheet 300 guided to the measuring path 231 is optically read by a reading unit 700. The sheet 300 which has passed through the through path 230 or the measuring path 231 is conveyed to the post-processing unit 600 through a discharge path 232. The measuring unit 500 measures the length LP of the sheet 300 in the conveyance direction when performing the position adjustment processing. To convey the sheet 300, a plurality of rollers are provided along the through path 230, the measuring path 231, and the discharge path 232. In the post-processing unit 600, post-processing such as alignment processing, stapling processing, and cutting processing is performed as necessary, and then the sheet 300 is discharged out of the image forming apparatus 100.

Figure 3A:
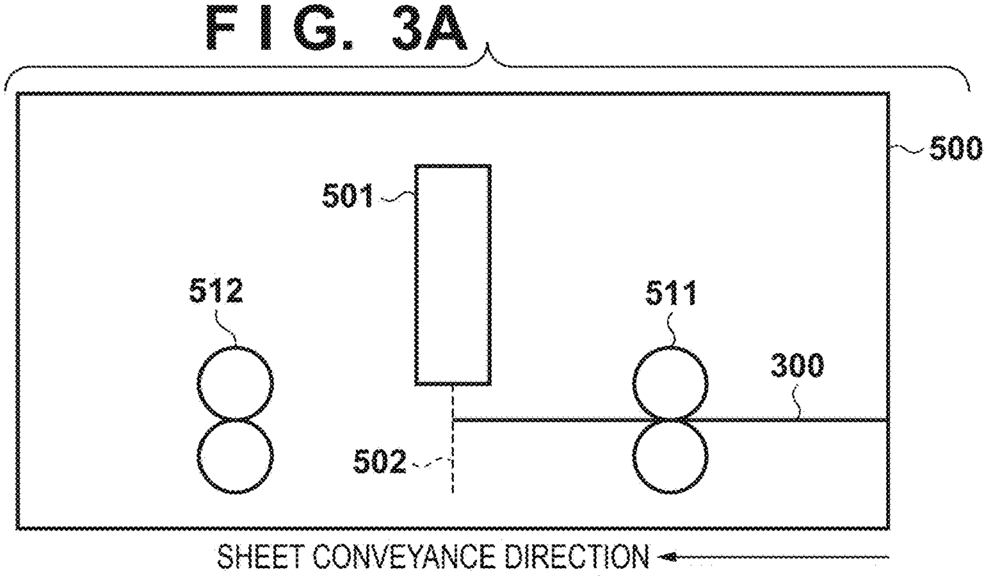
FIGS. 3A to 3C are schematic views illustrating an example of a configuration of a measuring unit.
Figure 3B:
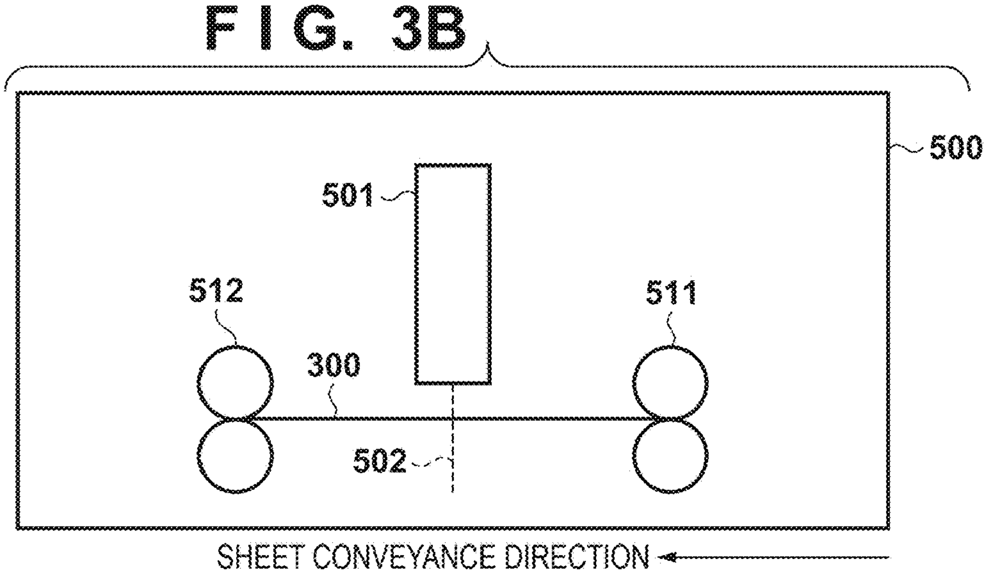
Figure 3C:
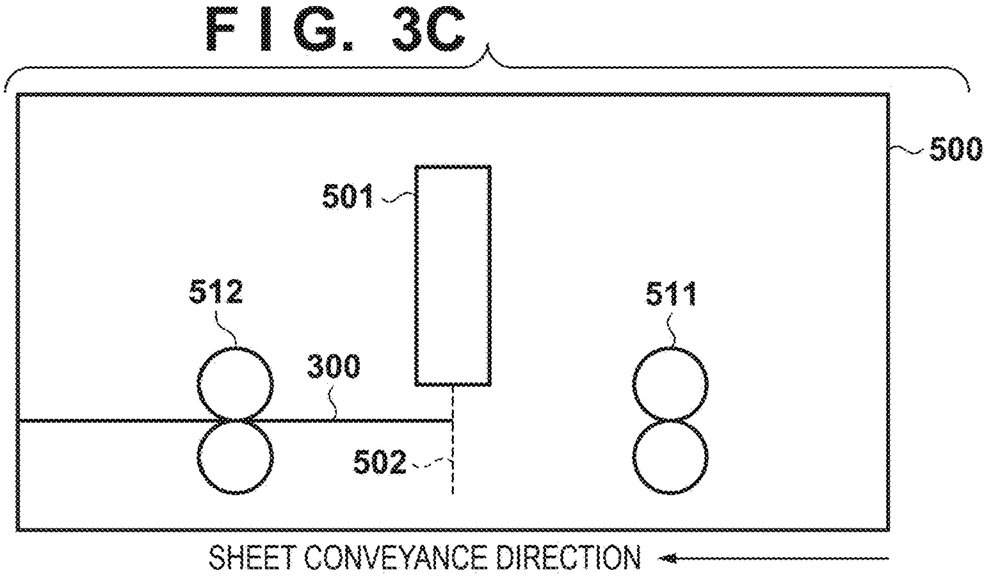

Next, the measuring unit 500 will be described. FIGS. 3A to 3C are views for explaining an example of a configuration of the measuring unit 500 and an operation thereof. The sheet 300 is conveyed in the conveyance direction by conveyance rollers 511 and 512. In FIGS. 3A to 3C, the conveyance direction is a direction from the right side to the left side. The measuring unit 500 includes an optical sensor 501 (i.e., a non-contact sensor), which is arranged between the conveyance rollers 511 and 512 in the conveyance direction. The optical sensor 501 includes a light source that emits light toward the conveyance path of the sheet and a light receiving element that receives light.

The optical sensor 501 is configured such that when the sheet 300 is in a detection position 502 of the optical sensor 501, reflected light of the light emitted by the light source of the optical sensor 501 is incident on the light receiving element of the optical sensor 501. Meanwhile, the optical sensor 501 is configured such that when the sheet 300 is not in the detection position 502 of the optical sensor 501, the light incident on the light receiving element of the optical sensor 501 is at least a predetermined amount less than that for when the sheet 300 is in the detection position of the optical sensor 501. Therefore, the optical sensor 501 can determine whether the sheet 300 is in the detection position 502 based on the amount of light received by the light receiving element. The measuring unit 500 outputs a signal indicating a detection result of the sheet 300, that is, whether the sheet 300 is being detected, to the controller 103.

FIGS. 3A to 3C respectively illustrate states in which the leading end, the center, and the trailing end, in the conveyance direction, of the sheet 300 being conveyed at a conveyance speed S have reached the detection position 502. By measuring a period (time) T in which the optical sensor 501 has detected the reflected light from the sheet 300, that is, the period T from the state of FIG. 3A to the state of FIG. 3C, the controller 103 can determine the length LP of the sheet 300 in the conveyance direction as T×S. A configuration may be taken so as to arrange the light source and the light receiving element in positions opposite to each other relative to the sheet 300 and, based on whether the light receiving element receives light from the light source, determine whether the sheet 300 is in the detection position 502.

Further, in FIGS. 3A to 3C, the length LP of the sheet in the conveyance direction is detected using the non-contact sensor, but a configuration may be taken so as to detect the length LP of the sheet in the conveyance direction using a contact sensor. Specifically, in place of the optical sensor 501 of FIGS. 3A to 3C, a flag that is in a first position when the sheet 300 is in the detection position 502 and that is in a second position when the sheet 300 is not in the detection position 502 is provided. Then, by measuring the period T in which the flag is in the first position, the controller 103 can obtain the length LP of the sheet 300 in the conveyance direction as T×S.

Figure 4A:
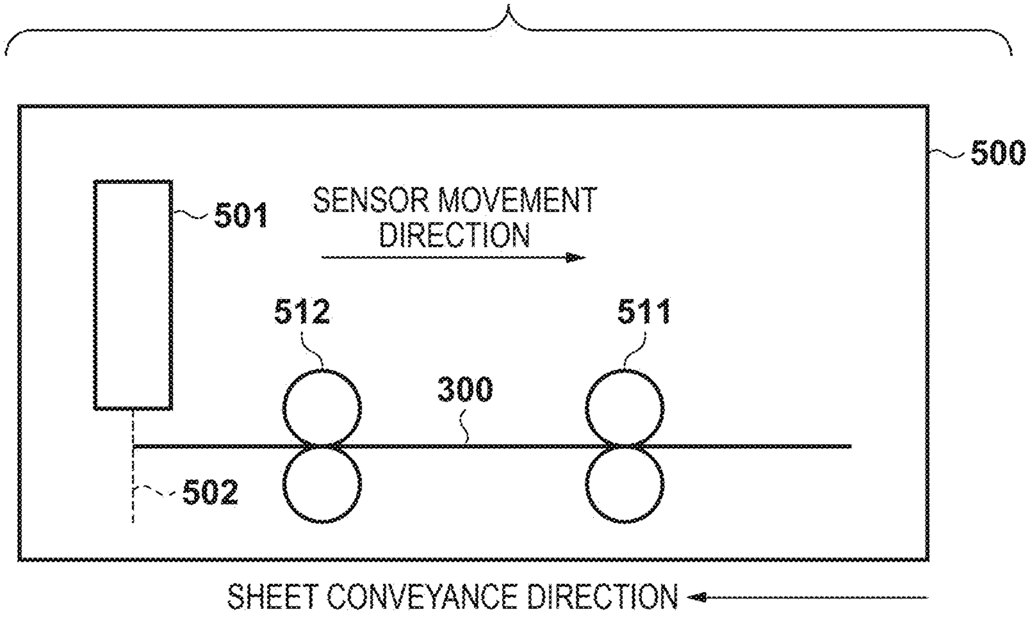
FIGS. 4A and 4B are schematic views illustrating another example of the configuration of the measuring unit.
Figure 4B:
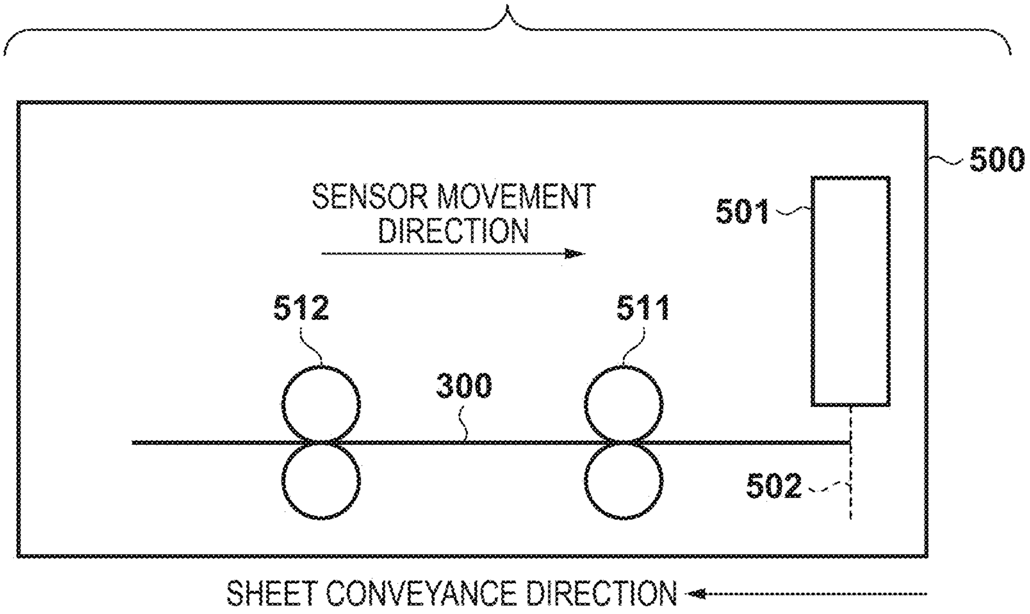

FIGS. 4A and 4B illustrate another example of the configuration of the measuring unit 500. In the configuration of FIGS. 3A to 3C, the position of the optical sensor 501 is fixed, and by conveying the sheet 300, the length LP of the sheet 300 in the conveyance direction is measured. In the example of the configuration of FIGS. 4A and 4B, the optical sensor 501 is configured to be capable of moving in the conveyance direction. In the example of the configuration of FIGS. 4A and 4B, when measuring the length LP of the sheet 300 in the conveyance direction, it is assumed that the optical sensor 501 is moved at a predetermined movement speed S in a movement direction that is a direction opposite to the conveyance direction of the sheet 300. Further, in the example of the configuration of FIGS. 4A and 4B, when measuring the length LP of the sheet 300 in the conveyance direction, it is assumed that the conveyance of the sheet 300 is stopped. FIG. 4A illustrates a state in which the detection position 502 of the optical sensor 501 reaches the leading end of the sheet 300 in the conveyance direction, and FIG. 4B illustrates a state in which the detection position 502 of the optical sensor 501 reaches the trailing end of the sheet 300 in the conveyance direction. By measuring the period T from the state of FIG. 4A to the state of FIG. 4B, the controller 103 can obtain the length LP of the sheet 300 in the conveyance direction as T×S.

Since positions in which the conveyance rollers 511 and 512 are provided and a position in which the optical sensor 501 is provided are different in a width direction, which is perpendicular to the conveyance direction of the sheet 300, the optical sensor 501 does not interfere with the conveyance rollers 511 and 512 even when the optical sensor 501 is moved in the movement direction. Further, in FIGS. 4A and 4B, the movement direction of the optical sensor 501 for when measuring the length LP of the sheet 300 in the conveyance direction is a direction opposite to the conveyance direction of the sheet, but the movement direction of the optical sensor 501 may be the same as the conveyance direction of the sheet. Further, in FIGS. 4A and 4B, the conveyance of the sheet 300 is stopped and the optical sensor 501 is moved, but a configuration may be taken so as to move the optical sensor 501 in a direction opposite to the conveyance direction of the sheet 300 while conveying the sheet 300. In this case, assuming that the conveyance speed of the sheet 300 is S1, the movement speed of the optical sensor 501 is S2, and the period in which the optical sensor 501 detects the sheet 300 is T, the length LP of the sheet 300 in the conveyance direction is obtained by (S1+S2)×T.

Figure 5:
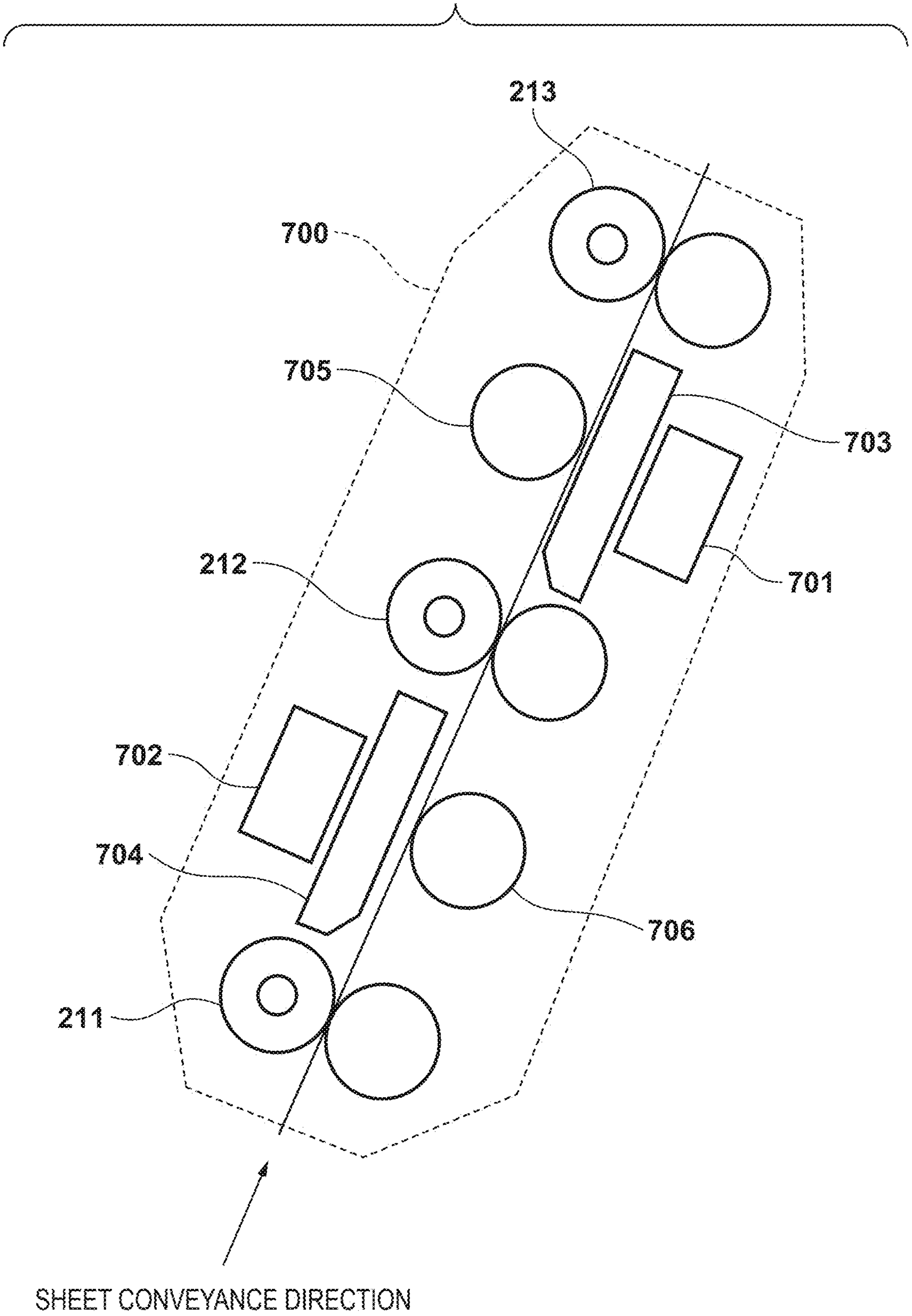
FIG. 5 is a schematic view of a configuration of a reading unit.

FIG. 5 is a schematic view of a configuration of the reading unit 700. In the reading unit 700, the sheet 300 is conveyed by conveyance rollers 211, 212, and 213. The reading unit 700 includes contact image sensors (CISs) 701 and 702, which optically read the sheet 300. Between conveyance rollers 211 and 212, the CIS 702 reads the second surface of the sheet through a glass 704. On the opposite side of the glass 704 relative to the conveyance path of the sheet 300, a black backing roller 706 is arranged to clarify the contrast with an edge of the sheet 300. Between conveyance rollers 212 and 213, the CIS 701 reads the first surface of the sheet through a glass 703. On the opposite side of the glass 703 relative to the conveyance path of the sheet 300, a black backing roller 705 is arranged to clarify the contrast with an edge of the sheet 300.

The CISs 701 and 702 each include a light source for irradiating light in the entire width direction perpendicular to the conveyance direction of the sheet, a line sensor for receiving reflected light from the sheet, and optical members for causing the reflected light from the sheet to be incident on respective light receiving elements of the line sensor. The line sensor reads an image of one line of the sheet 300 in the width direction by receiving reflected light from the sheet 300. By repeating reading of one line of the sheet 300 in the width direction while the sheet 300 is being conveyed, the CISs 701 and 702 optically read the entire second surface and first surface of the sheet 300.

Figure 6:
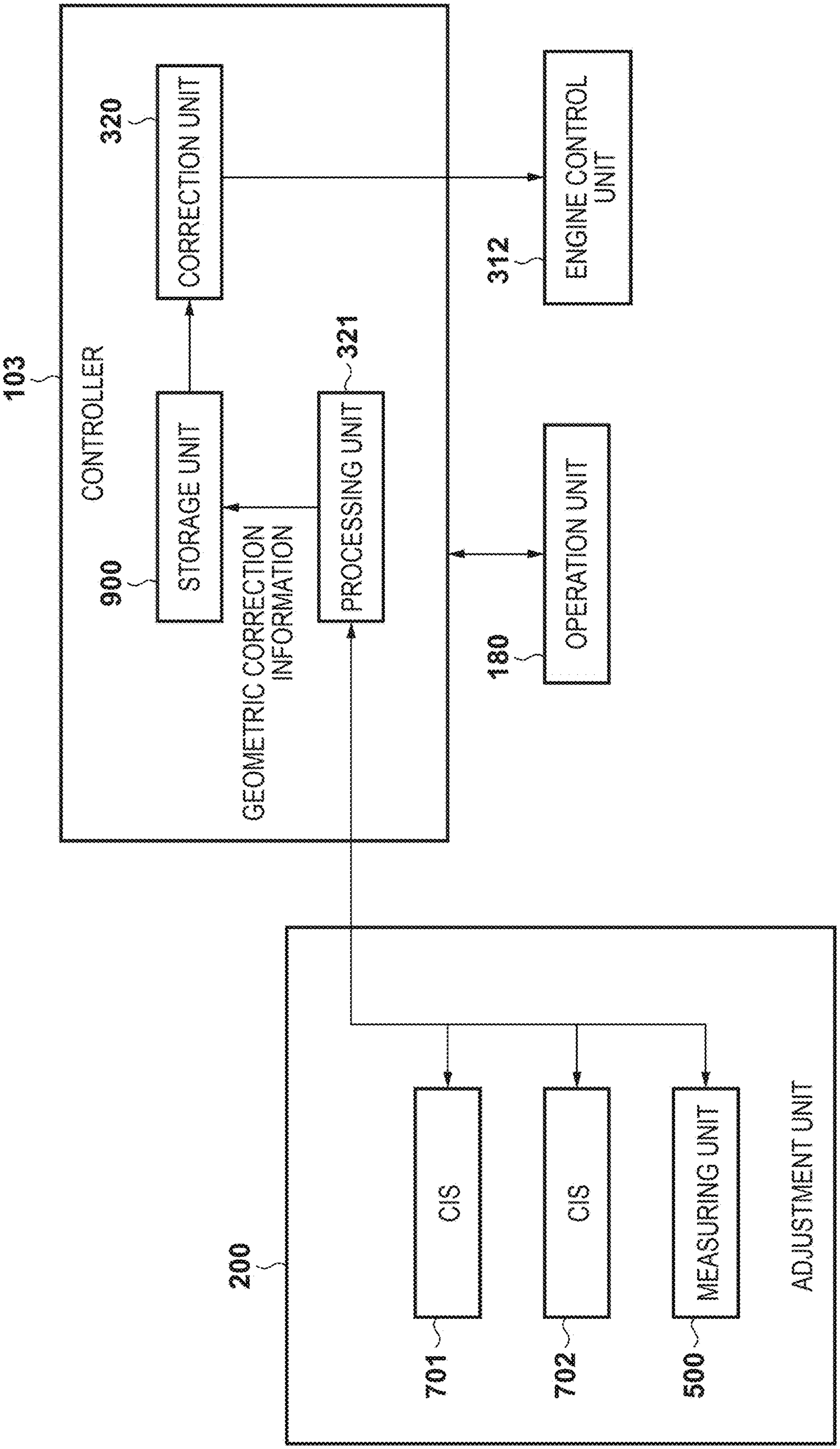
FIG. 6 is a view of a control configuration of the image forming apparatus.

FIG. 6 is a view of a control configuration of the image forming apparatus 100. The controller 103 controls the entire image forming apparatus 100. A storage unit 900 is constituted, for example, by a volatile memory or a non-volatile memory, and stores data, a control program, and the like used by the controller 103 in the control. The controller 103 includes one or more processors (not illustrated), and a correction unit 320 and a processing unit 321 illustrated in FIG. 6 are realized by the one or more processors executing the control program stored in the storage unit 900.

The processing unit 321 creates geometric correction information in the position adjustment processing to be described later and stores it in the storage unit 900. FIG. 7 illustrates an example of geometric correction information. "Sheet type" is information related to the type of the sheet 300 and includes, for example, information of "sheet name", "size", "grammage", "surface property" and "color". "Sheet name" indicates a name assigned to the sheet 300 to identify the sheet 300. "Size" indicates the size of the sheet 300, such as a nominal value of a length on a long side and a nominal value of a length of a short side. When the sheet is of a standard size such as an A4 size or an A3 size, "size" may be indicated by the standard size. "Grammage", "surface property" and "color" respectively indicate the grammage, surface property and color of the sheet 300.

"Orientation" indicates the orientation of the sheet for when conveying the sheet. When conveying the sheet 300 with its long side parallel to the conveyance direction, "orientation" is set to "portrait". Further, when conveying the sheet 300 with its short side parallel to the conveyance direction, "orientation" is set to "landscape". A nominal value (reference value) of the length LP of the sheet 300 in the conveyance direction is determined based on "sheet type" and "orientation". For example, when conveying the sheet 300 with a name S #1 in portrait orientation, a nominal value of the length LP of the sheet 300 in the conveyance direction is Ll, and when conveying it in landscape orientation, a nominal value of the length LP of the sheet 300 in the conveyance direction is Ls.

"First surface" of "adjustment amount" is parameters for adjusting an image forming position on the first surface (front surface) of the sheet 300. "Second surface" of "adjustment amount" is parameters for adjusting an image forming position on the second surface (back surface) of the sheet 300. According to FIG. 7, parameters for adjusting an image forming position include "lead position", "side position", "main scanning magnification" and "sub-scanning magnification". "Lead position" is a parameter for adjusting the image forming position in the conveyance direction of the sheet 300. When the lead position is X, the image forming position in the conveyance direction is shifted toward the trailing end side of the sheet 300 by X from a reference position. "Side position" is a parameter for adjusting the image forming position in the width direction of the sheet 300. When the side position is X, the image forming position on the left end of the sheet 300 with respect to the conveyance direction is shifted to the right by X from a reference position. "Main scanning magnification" is a parameter for adjusting the size of an image in the main scanning direction. The main scanning direction corresponds to the width direction on the sheet 300. When the main scanning magnification is X %, the image size in the width direction is enlarged by X % from a reference size. "Sub-scanning magnification" is a parameter for adjusting the size of an image in the sub-scanning direction. The sub-scanning direction corresponds to the conveyance direction of the sheet 300. When the sub-scanning magnification is X %, the image size in the conveyance direction is enlarged by X % from a reference size. The parameters included in the geometric correction information of FIG. 7 are examples, and the parameters included in the geometric correction information are not limited to those indicated in FIG. 7.

Returning to FIG. 6, when forming an image on the sheet 300 based on image data, the correction unit 320 refers to the geometric correction information and thereby obtains adjustment amounts corresponding to the type and the orientation of the sheet 300 and the surface of the sheet 300 on which an image is to be formed. Then, the correction unit 320 controls the engine control unit 312 such that the image forming position of the sheet 300 is in a target position based on the obtained adjustment amounts and forms an image on the sheet 300. By thus forming an image on the sheet 300 based on the geometric correction information, the image forming position can be made to approach the target position with high accuracy. The geometric correction information is an image forming condition for adjusting or controlling the image forming position.

Figure 8:
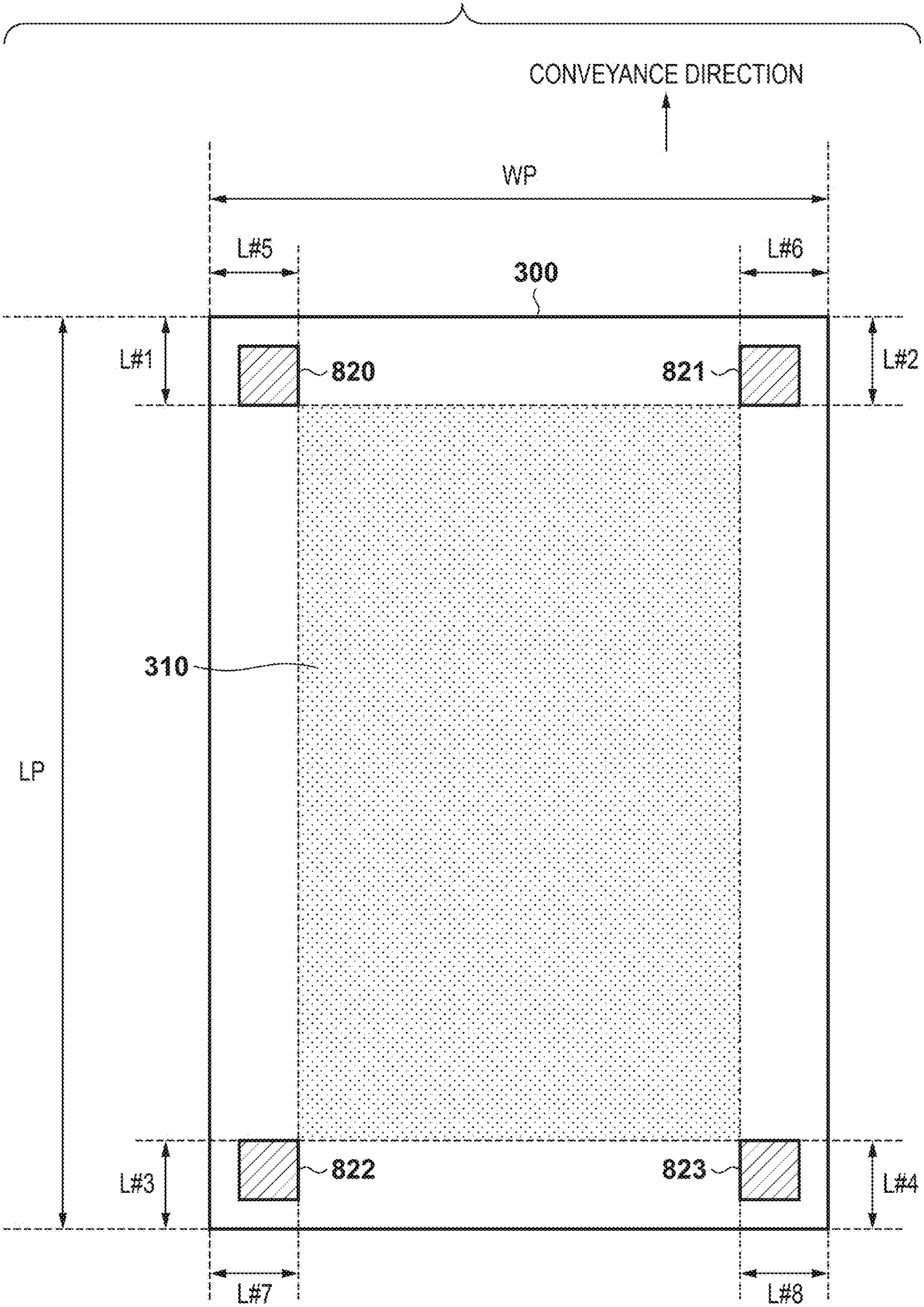
FIG. 8 is a view illustrating an example of a position adjustment pattern.

Next, position adjustment processing for generating geometric correction information will be described. FIG. 8 illustrates an example of a position adjustment pattern formed on the sheet 300 for position adjustment processing. In the following description, the leading end and the trailing end in the conveyance direction will simply be referred to as the "leading end" and the "trailing end". Further, in the following description, "right" and "left" refer to right and left when viewed with respect to the conveyance direction. The position adjustment pattern is formed in a region different from an image forming region 310 in which a user image is formed on the sheet 300 when a user executes a print job that involves position adjustment processing through the operation unit 180. The user image refers to an image formed on the sheet 300 by the user. In the example of FIG. 8, the position adjustment pattern includes marks 820, 821, 822 and 823.

With the mark 820, a distance L #1, from the leading end of the sheet 300 to the image forming region 310 on the left side of the sheet 300, and a distance L #5, from the left end of the sheet 300 to the image forming region 310 on the leading end side of the sheet 300, are measured. The distance L #1 and the distance L #5 correspond to a position of a corner of the image forming region 310 on the left leading end side. With the mark 821, a distance L #2, from the leading end of the sheet 300 to the image forming region 310 (in which an image is formed on the sheet) on the right side of the sheet 300, and a distance L #6, from the right end of the sheet 300 to the image forming region 310 on the leading end side of the sheet 300, are measured. The distance L #2 and the distance L #6 correspond to a position of a corner of the image forming region 310 on the right leading end side. With the mark 822, a distance L #3, from the trailing end of the sheet 300 to the image forming region 310 on the left side of the sheet 300, and a distance L #7, from the left end of the sheet 300 to the image forming region 310 on the trailing end side of the sheet 300, are measured. The distance L #3 and the distance L #7 correspond to a position of a corner of the image forming region 310 on the left trailing end side. With the mark 823, a distance L #4, from the trailing end of the sheet 300 to the image forming region 310 on the right side of the sheet 300, and a distance L #8, from the right end of the sheet 300 to the image forming region 310 on the trailing end side of the sheet 300, are measured. The distance L #4 and the distance L #8 correspond to a position of a corner of the image forming region 310 on the right trailing end side.

The position adjustment pattern illustrated in FIG. 8 is formed on a surface of the sheet 300 on a side for which position adjustment is to be performed. That is, when adjusting the image forming position on the first surface, the position adjustment pattern illustrated in FIG. 8 is formed on the first surface of the sheet 300. Further, when adjusting the image forming position on both the first surface and the second surface, the position adjustment pattern illustrated in FIG. 8 is formed on the first surface and the second surface of the sheet 300.

The processing unit 321 determines the distances L #1 to L #8 in FIG. 8, that is, in which positions on the sheet 300 the four corners of the image forming region 310 are formed, by obtaining a result of reading of the position adjustment pattern by the reading unit 700. The processing unit 321 generates the geometric correction information illustrated in FIG. 7 such that a user image is formed without distortion in the image forming region 310, based on the distances L #1 to L #8 and the lengths LP and WP (FIG. 8) of the sheet 300 in the conveyance direction and the width direction.

Figure 9B:
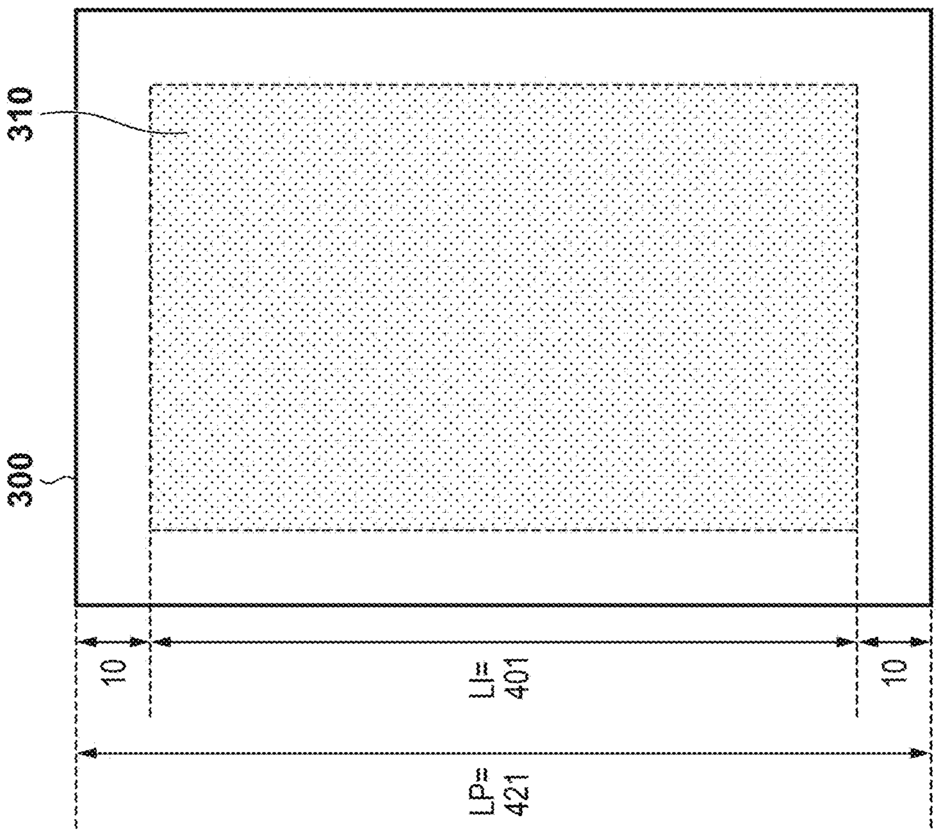
FIGS. 9A and 9B are views for explaining effects on an image forming region for when a length of a sheet varies in a conveyance direction.
Figure 9A:
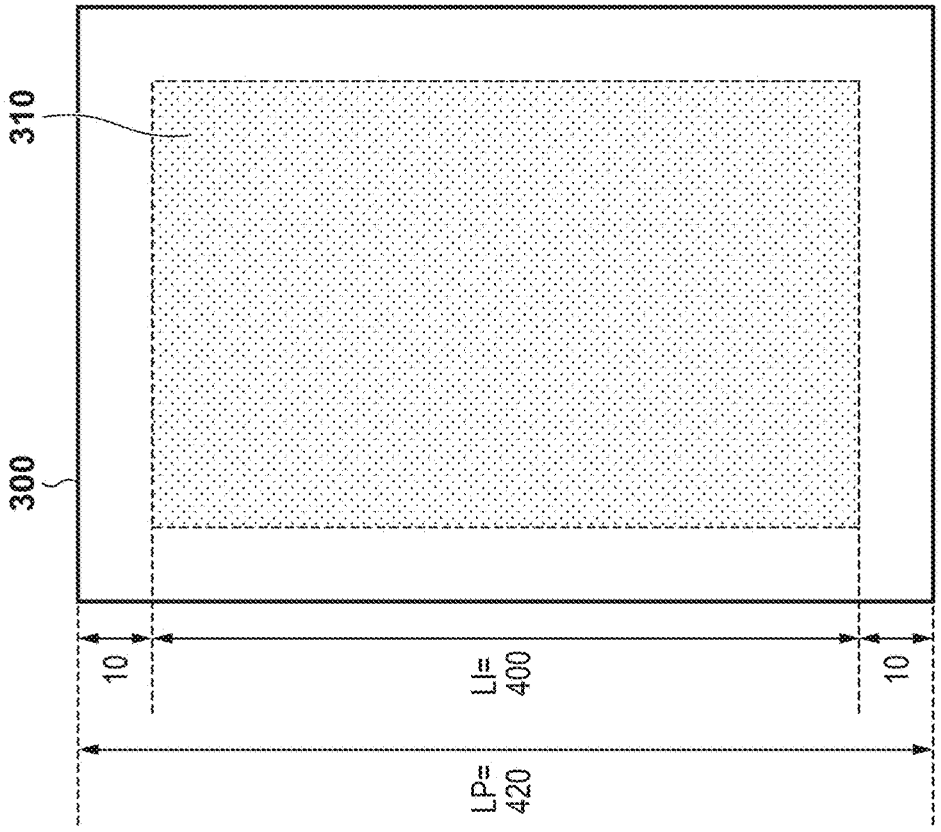

For example, it is assumed that the sheet 300 of an A3 size is conveyed in portrait orientation, that is, the long side is parallel to the conveyance direction, and a length LI of the image forming region 310 in the conveyance direction is adjusted to be 400 mm as illustrated in FIG. 9A. In this case, the target values of the distances L #1 to L #4 are each set to be 10 mm, and by obtaining the adjustment amounts such that the distances L #1 to L #4 approach the target values based on the measured values of the distances L #1 to L #4, the length LI of the image forming region 310 in the conveyance direction can be made to be 400 mm.

However, in the case of a cut sheet, due to a cutting error and the like, the length LP of the sheet 300 in the conveyance direction may be different from its nominal value. Further, due to expansion and contraction of the sheet 300 during the fixing processing in the fixing devices 150 and 160, the length LP of the sheet 300 may vary from its nominal value. For example, as illustrated in FIG. 9B, if the actual length LP of the sheet 300 is 421 mm, when the adjustment amount is obtained such that the distances L #1 to L #4 approaches the target values which are each 10 mm, the length LI of the image forming region 310 in the conveyance direction will be 401 mm, and the length of the image forming region 310 in the conveyance direction will be enlarged. Therefore, a user image formed in the image forming region 310 will also be enlarged in the conveyance direction.

Figure 10:
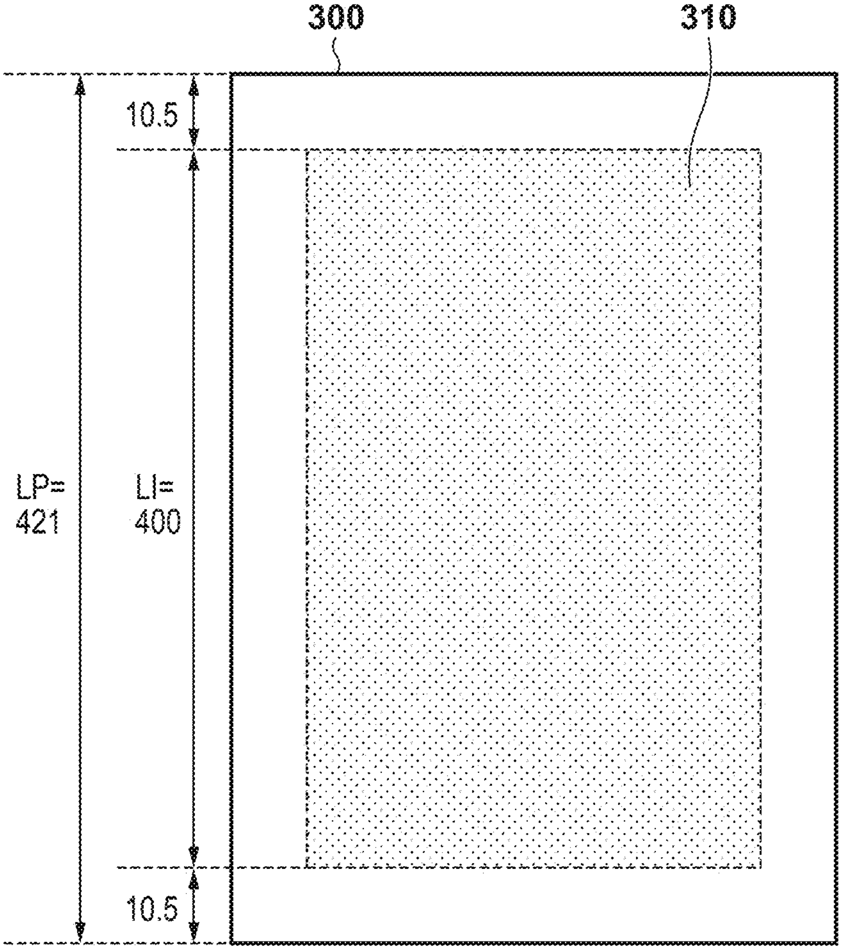
FIG. 10 is a view illustrating an image forming region in which effects of variation in length of a sheet in the conveyance direction have been reduced.

Therefore, in the present embodiment, the target values of the distances L #1 to L #4 are determined based on the measured value of the length LP of the sheet 300 in the conveyance direction measured by the measuring unit 500. For example, when the measured value of the length LP of the sheet 300 in the conveyance direction is 421 mm as illustrated in FIG. 10, in order to make the length LI of the image forming region 310 in the conveyance direction 400 mm, the target values of the distances L #1 to the distance L #4 may each be set to 10.5 mm. By thus setting the target values of the distances L #1 to L #4, the length LI of the image forming region 310 in the conveyance direction can be made to be 400 mm, which is a target value, as illustrated in FIG. 10.

Figure 11:
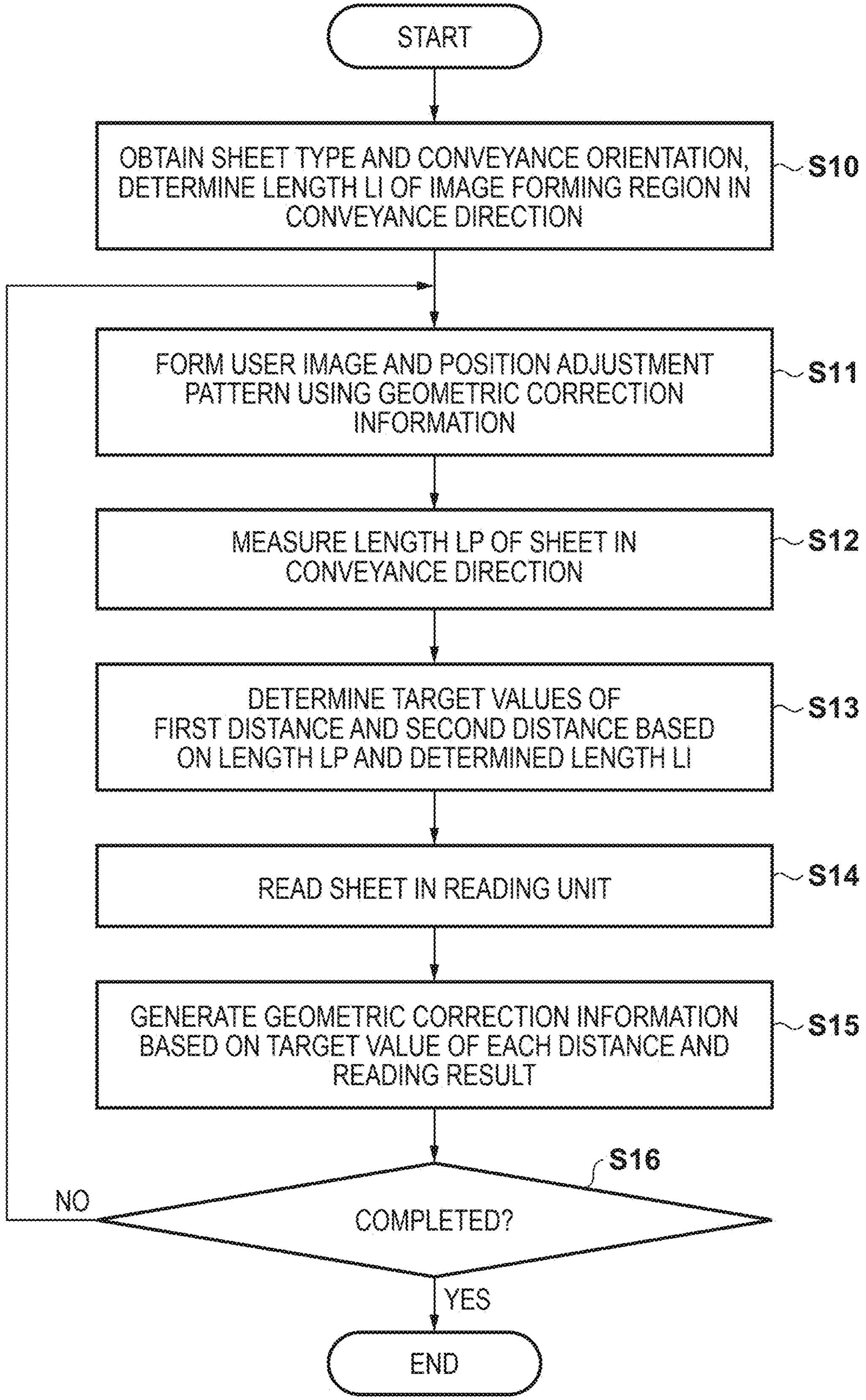
FIG. 11 is a flowchart of position adjustment processing.
Figure 12:
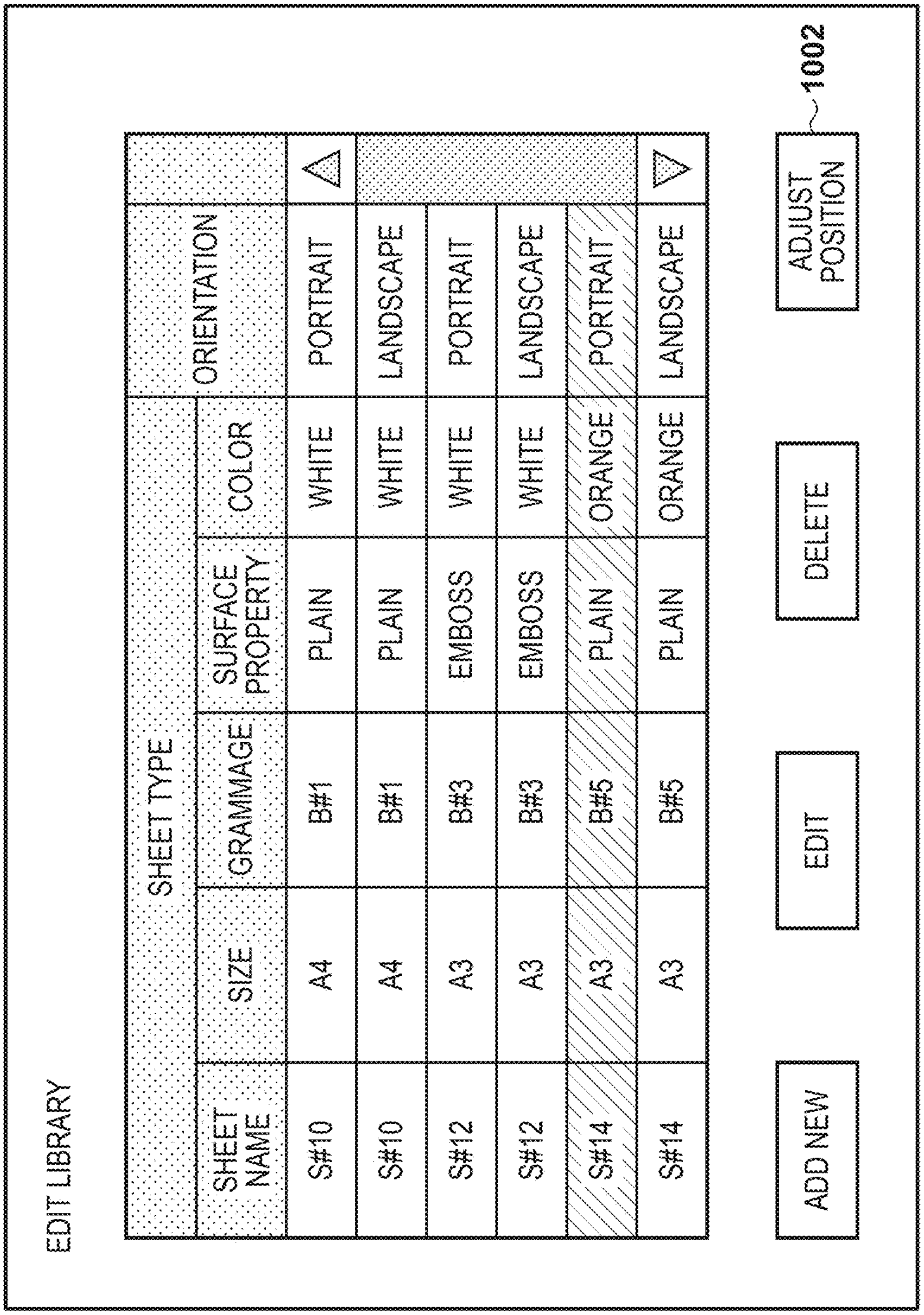
FIG. 12 is a view illustrating an example of a screen displayed on an operation unit in relation to the position adjustment processing.

FIG. 11 is a flowchart of position adjustment processing. The position adjustment processing is also processing for generating or updating geometric correction information. As described above, in the present embodiment, the position adjustment processing is performed together with processing for forming a user image based on a print job. FIG. 12 illustrates an example of a setting screen for executing position adjustment processing. For example, by operating a position adjustment button 1002 on the screen of FIG. 12 displayed on the operation unit 180, the user can select a sheet type and an orientation for generating the geometric correction information. Then, when a print job for forming a user image with the sheet type and the orientation selected on the screen of FIG. 12 is started, the processing of FIG. 11 is started.

In the following description, the distance L #1 and the distance L #2 of FIG. 8 are collectively denoted as a "first distance", and the distance L #3 and the distance L #4 are collectively denoted as a "second distance". The first distance is a distance in the conveyance direction from the leading end of the sheet 300 in the conveyance direction to the image forming region 310, and the second distance is a distance in the conveyance direction from the trailing end of the sheet 300 in the conveyance direction to the image forming region 310. Similarly, in the following description, the distance L #5 and the distance L #7 are collectively denoted as a "third distance", and the distance L #6 and the distance L #8 are collectively denoted as a "fourth distance". The third distance is a distance in the width direction from the left end of the sheet 300 to the image forming region 310, and the fourth distance is a distance in the width direction from the right end of the sheet 300 to the image forming region 310.

Further, as described in FIGS. 9 and 10, the present embodiment reduces a change in the length LI of the image forming region 310 in the conveyance direction caused by a change in the length LP of the sheet 300 in the conveyance direction. Therefore, processing for the length in the conveyance direction will be mainly described below.

In step S10 of FIG. 11, the controller 103 obtains a sheet type and a conveyance orientation. The controller 300 determines the length LI of the image forming region 310 in the conveyance direction based on the sheet type and the conveyance orientation. Information indicating a relationship between the length LI of the image forming region 310 in the conveyance direction and a combination of the sheet type and the conveyance orientation is stored in advance in the storage unit 900. For example, when the sheet 300 of an A3 size is conveyed in portrait orientation as illustrated in FIG. 9A, the length LI of the image forming region 310 in the conveyance direction is determined to be 400 mm based on the information stored in the storage unit 900.

In step S11, the controller 103 forms a user image and a position adjustment pattern on the sheet 300 using geometric correction information corresponding to the combination of the sheet type and the conveyance orientation stored in the storage unit 900. The sheet 300 on which an image has been formed is conveyed to the adjustment unit 200.

In step S12, the processing unit 321 obtains a measured value of the length LP of the sheet 300 in the conveyance direction based on a result of detection of the sheet 300 by the measuring unit 500. In step S13, the processing unit 321 determines a first target value of the first distance and a second target value of the second distance based on the length LI of the image forming region 310 in the conveyance direction determined in step S10 and the measured length LP of the sheet 300 in the conveyance direction.

As an example, a ratio of the first target value to the second target value is set in the processing unit 321, and the processing unit 321 determines the first target value and the second target value by distributing a difference between the length LP and the length LI among the first target value and the second target value based on the set ratio. For example, in the example of FIG. 10, the difference between the length LP and the length LI is 21 mm. Therefore, by distributing the difference 21 mm among the first target value and the second target value such that the ratio of the first target value to the second target value is one-to-one, the first target value and the second target value are determined to be 10.5 mm as illustrated in FIG. 10. The ratio of the first target value to the second target value, for example, is set in advance by the user. Further, for example, the ratio of the first target value to the second target value can be determined based on the combination of the sheet type and the conveyance orientation. In this case, information indicating a relationship between the ratio of the first target value to the second target value and the combination of the sheet type and the conveyance orientation is stored in advance in the storage unit 900. Then, the processing unit 321 determines the ratio of the first target value to the second target value based on the information stored in the storage unit 900 and the combination of the sheet type and the conveyance orientation obtained in step S10.

The processing unit 321 can be configured to determine one value of the first target value and the second target value to be a fixed value and determine the other value of the first target value and the second target value based on the difference between the length LP and the length LI. As an example, assuming that the first target value is fixed at 10 mm, if the difference between the length LP and the length LI is 21 mm, the second target value will be 11 mm obtained by subtracting 10 mm, which is the first target value, from the difference. When one of the first target value and the second target value is set to be a fixed value, the fixed value may be set in advance by the user. Alternatively, the fixed value may be determined based on the combination of the sheet type and the conveyance orientation obtained in step S10. In this case, information indicating a relationship between one value of the first target value and the second target value and the combination of the sheet type and the conveyance orientation is stored in advance in the storage unit 900. Then, the processing unit 321 determines one value of the first target value and the second target value based on the information stored in the storage unit 900 and the combination of the sheet type and the conveyance orientation obtained in step S10.

In step S14, the processing unit 321 determines the distance L #1 to the distance L #8 by obtaining a result of reading of the position adjustment pattern by the reading unit 700. In step S15, the processing unit 321 generates geometric correction information of the sheet 300 based on the result of reading by the reading unit 700, that is, the determined values of the distance L #1 to the distance L #8 and the target values of the first distance to the fourth distance, and stores them in the storage unit 900.

In step S16, the controller 103 determines whether the image formation of the print job has been completed. When the image formation has been completed, the controller 103 terminates the processing of FIG. 11. Meanwhile, if the image formation of the print job has not been completed, the controller 103 repeats the processing from step S11. The geometric correction information used for image formation in step S11 in the repetition is that generated in step S15 there before.

Although not specified in the flowchart of FIG. 11, a length WI of the image forming region 310 in the widthwise direction can be determined based on the sheet type and the conveyance orientation obtained in step S10. In this case, information indicating a relationship between the length WI of the image forming region 310 in the width direction and the combination of the sheet type and the conveyance orientation is stored in advance in the storage unit 900. Further, the target values of the third distance and the fourth distance in the width direction are determined based on, for example, the combination of the sheet type and the conveyance orientation obtained in step S10. In this case, information indicating a relationship between the target values of the third distance and the fourth distance and the combination of the sheet type and the conveyance orientation is stored in advance in the storage unit 900.

Alternatively, the target values of the third distance and the fourth distance in the width direction may be determined based on a measured value of the length WP in the width direction of the sheet 300. Specifically, since the reading unit 700 reads the entire width direction of the sheet 300, the controller 103 can obtain the measured value of the length WP of the sheet 300 in the width direction based on a reading result of the reading unit 700. Then, similarly to the first target value of the first distance and the second target value of the second distance, one or both target values of the third distance and the fourth distance are determined based on a difference between the measured value of the length WP of the sheet 300 in the width direction and the length WI of the image forming region 310 in the width direction. When determining both target values of the third distance and the fourth distance, a ratio of the two target values may be determined based on the sheet type and the conveyance orientation. Further, when determining one target value of the third distance and the fourth distance, the other target value may be determined based on the sheet type and the conveyance orientation.

Further, in the processing of FIG. 11, the geometric correction information is updated each time an image is formed on one sheet 300, but a configuration may be taken so as to update the geometric correction information each time an image is formed on N (N is an integer of 2 or more) sheets 300. In this case, the geometric correction information can be created by averaging N adjustment amounts obtained in N sheets of image formation. Further, in the present embodiment, the position adjustment processing is performed together with the user image forming processing, but a configuration may be taken so as to perform only the position adjustment processing alone. In this case, only the position adjustment pattern is formed on the sheet 300, and the geometric correction information is created.

Further, in the above description, the distance L #1 and the distance L #2 are collectively denoted as the "first distance", and the distance L #3 and the distance L #4 are collectively denoted as the "second distance". This is on the premise that the target values of the distance L #1 and the distance L #2 are the same value and the target values of the distance L #3 and the distance L #4 are the same value. However, a configuration may be taken such that the target values of the distance L #1 and the distance L #2 are different values, and the target values of the distance L #3 and the distance L #4 are different values. In this case, the target values of the distance L #1 and the distance L #3 are determined similarly to the above first target value of the first distance and second target value of the second distance based on the difference between the length LP and the length LI. Further, the target values of the distance L #2 and the distance L #4 are determined similarly to the above first target value of the first distance and second target value of the second distance based on the difference between the length LP and the length LI. However, the target value of the distance L #1 and the target value of the distance L #2 may be different, and the target value of the distance L #3 and the target value of the distance L #4 may be different. It is similar for the distance L #5 to the distance L #8 in the width direction.

In the above embodiment, the positions of the four corners of the image forming region 310 are determined by the adjustment pattern, and the geometric correction information is generated such that the four corners approach the target values. That is, the length LI, in the conveyance direction, and the length WI, in the width direction, of the image forming region 310 are the target values. However, in order to reduce the variation in length of the user image in the conveyance direction, the concept of the above embodiment can be applied to control in which only the length LI of the image forming region 310 from the leading end to the trailing end in the conveyance direction is set as the target value. In this case, the adjustment pattern is a pattern for determining the first distance and the second distance, and the processing unit 321 determines the adjustment amounts by determining only the first target value of the first distance and the second target value of the second distance based on the difference between the length LP and the length LI.

As described above, the measuring unit 500 which measures the length LP of the sheet 300 in the conveyance direction is provided, and at least one of the first target value and the second target value is set based on the measured value of the length LP by the measuring unit 500. With this configuration, even when the length LP of the sheet 300 in the conveyance direction is different from the nominal value, it is possible to reduce degradation in the accuracy of adjustment of the image forming position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-223260, filed Dec. 28, 2023, which is hereby incorporated by reference herein in its entirety.

What is claimed is:

1. An image forming apparatus comprising:

an image forming unit configured to form an adjustment pattern on a sheet;

a fixing member configured to fix the adjustment pattern on the sheet by heating the adjustment pattern on the sheet;

a conveyance roller configured to convey the sheet on which the adjustment pattern has been fixed by the fixing member;

a reading device provided further downstream than the fixing member in a conveyance direction in which the conveyance roller conveys the sheet, and configured to read the sheet on which the adjustment pattern has been fixed by the fixing member, wherein the adjustment pattern includes a mark formed in a leading region of the sheet in the conveyance direction;

a sensor provided further downstream than the fixing member in the conveyance direction, and configured to detect a length of the sheet in the conveyance direction; and a processor configured to:

obtain a target length of the sheet in the conveyance direction based on setting information relating to the sheet;

determine a first target distance from a leading end of the sheet to an image forming region in the conveyance direction based on the target length and the detected length of the sheet detected by the sensor;

detect a first distance from the leading end of the sheet to the mark in the conveyance direction based on a reading result obtained by the reading device reading the sheet on which the adjustment pattern has been fixed; and adjust a position, in the conveyance direction, of an image to be formed by the image forming unit, based on the first target distance and the first distance.

2. The image forming apparatus according to claim 1, wherein the sensor is configured to measure a time period in which the sheet passes a detection position of the sensor, and wherein the length of the sheet in the conveyance direction is determined based on the time period measured by the sensor.

3. The image forming apparatus according to claim 2, wherein the sensor is an optical sensor.

4. The image forming apparatus according to claim 2, wherein the sensor is a flag-type sensor including a flag that is in a first position when the sheet is in the detection position and is in a second position different from the first position when the sheet is not in the detection position.

5. The image forming apparatus according to claim 1, wherein the sensor is configured to be capable of moving in the conveyance direction, and is configured to measure a time period in which the sensor moves from a leading end, in the conveyance direction, to a trailing end, in the conveyance direction, of the sheet for which conveyance has been stopped, and wherein the length of the sheet in the conveyance direction is determined based on the time period measured by the sensor.

6. The image forming apparatus according to claim 1, wherein the processor is further configured to determine a second target distance from a trailing end of the sheet to the image forming region in the conveyance direction based on the target length and the detected length of the sheet detected by the sensor.

7. The image forming apparatus according to claim 6, wherein the processor is further configured to determine the first target distance and the second target distance, based on a difference between the target length and the detected length of the sheet detected by the sensor.

8. The image forming apparatus according to claim 6, wherein the processor is further configured to determine the first target distance and the second target distance based on a difference between the target length and the detected length of the sheet detected by the sensor and a ratio.

9. The image forming apparatus according to claim 8, wherein the processor is further configured to determine the ratio based on the setting information.

10. The image forming apparatus according to claim 1, wherein the reading device includes a first reading sensor which reads a first surface of the sheet and a second reading sensor which reads a second surface opposite to the first surface of the sheet.

11. The image forming apparatus according to claim 1, wherein the processor is further configured to adjust a position, in a direction perpendicular to the conveyance direction, and a size, in the direction perpendicular to the conveyance direction, of the image to be formed by the image forming unit, based on the reading result of the reading device.

12. The image forming apparatus according to claim 1, wherein the adjustment pattern includes a plurality of marks formed in corner regions of the sheet.

13. The image forming apparatus according to claim 1, wherein the fixing member includes a fixing roller including a heater.

14. The image forming apparatus according to claim 1, wherein the sensor is provided between the fixing member and the reading device in the conveyance direction.

15. The image forming apparatus according to claim 6, wherein:

the adjustment pattern further includes another mark formed in a trailing region of the sheet in the conveyance direction;

the processor is further configured to detect a second distance from the trailing end of the sheet to the other mark in the conveyance direction based on the reading result obtained by the reading device reading the sheet on which the adjustment pattern has been fixed; and the processor is further configured to adjust a size, in the conveyance direction, of an image to be formed by the image forming unit, based on the first target distance, the first distance, the second target distance, and the second distance.

* * * * *